(12) United States Patent
Takase et al.

(10) Patent No.: US 6,384,767 B1
(45) Date of Patent: May 7, 2002

(54) CIRCULARLY POLARIZING RADAR TRANSPONDER AND LIFESAVING APPARATUS

(75) Inventors: Kazuyoshi Takase; Kenji Nishimura, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/452,374

(22) Filed: Dec. 1, 1999

(30) Foreign Application Priority Data

Jul. 12, 1999 (JP) .............................. 11-197905

(51) Int. Cl.$^7$ .............................................. G01S 13/76
(52) U.S. Cl. .............................. 342/51; 342/42; 342/44; 342/188
(58) Field of Search .............................. 342/42, 44, 51, 342/175, 188

(56) References Cited

U.S. PATENT DOCUMENTS

| | | | | |
|---|---|---|---|---|
| 3,757,345 A | * | 9/1973 | Carver | 343/786 |
| 4,042,935 A | * | 8/1977 | Ajioka et al. | 343/795 |
| 4,707,702 A | * | 11/1987 | Withers | 343/786 |
| 4,926,187 A | * | 5/1990 | Sugawara et al. | 342/361 |
| 4,931,808 A | * | 6/1990 | Lalezari et al. | 343/753 |
| 5,414,427 A | * | 5/1995 | Gunnarsson | 342/51 |
| 5,523,767 A | * | 6/1996 | McCorkle | 343/810 |
| 5,819,859 A | * | 10/1998 | Stump et al. | 175/26 |
| 6,184,841 B1 | * | 2/2001 | Shober et al. | 343/853 |
| 6,232,910 B1 | * | 5/2001 | Bell et al. | 342/70 |
| 6,243,036 B1 | * | 6/2001 | Chadwick et al. | 342/27 |
| 6,259,991 B1 | * | 7/2001 | Nysen | 701/300 |
| 6,275,180 B1 | * | 8/2001 | Dean et al. | 342/70 |
| 6,281,791 B1 | * | 8/2001 | Duan et al. | 340/572.1 |

* cited by examiner

Primary Examiner—John B. Sotomayor
(74) Attorney, Agent, or Firm—Rothwell, Figg, Ernst & Manbeck

(57) ABSTRACT

Described herein is a circularly polarizing radar transponder. The circularly polarizing radar transponder comprises a helical type circularly polarizing antenna unit for receiving all of a circularly polarized wave, a vertically polarized wave and a horizontally polarized wave therein, a receiver unit connected to the helical type circularly polarizing antenna unit, a transmitter unit for generating a plurality of pulses with a radio wave received by the receiver unit as a trigger, and a battery unit for supplying power to these receiver and transmitter units.

16 Claims, 4 Drawing Sheets

CIRCULARLY POLARIZING RADAR TRANSPONDER AND LIFESAVING APPARATUS

BACKGROUND OF THE INVENTION

1. Field of the Invention

The present invention relates to a circularly polarizing radar transponder capable of being adapted to any of a circularly polarizing radar, a horizontally polarizing radar and a vertically polarizing radar, as well as a lifesaving apparatus using the same.

2. Description of the Background Art

As a radar transponder which has heretofore been used in lifesaving apparatus, there is known one shown in FIG. 7 by way of example.

In the drawing, reference numeral 11 indicates a slot type horizontally polarizing antenna unit common to transmission and reception, which is capable of transmitting and receiving a radio wave corresponding to a horizontally polarized wave. Reference numeral 2 indicates a receiver unit for amplifying and detecting the radio wave received by the slot type horizontally polarizing antenna unit 11 to thereby generate a trigger signal therefrom. Reference numeral 3 indicates a transmitter unit for generating a plurality of sweep signals lying in the same frequency band as that of the radar wave, based on the trigger signal sent from the receiver unit 2. Reference numeral 4 indicates a battery unit for supplying power to the receiver unit 2 and the transmitter unit 3. Reference numeral 5 indicates a case with a radome, which accommodates the slot type horizontally polarizing antenna unit 11, the receiver unit 2, the transmitter unit 3 and the battery unit 4 therein.

The operation of the radar transponder will next be explained.

A radio wave received by the slot type horizontally polarizing antenna unit 11 is amplified and detected by the receiver unit 2, followed by supply to the transmitter unit 3 as a trigger signal indicative of the incoming of the radar wave. The transmitter unit 3 generates a plurality of sweep signals lying within the same frequency band as that of the radar wave, based on the trigger signal sent from the receiver unit 2 and sends these sweep signals to the slot type horizontally polarizing antenna unit 11. The slot type horizontally polarizing antenna unit 11 radiates the plurality of sweep signals sent from the transmitter unit 3 into space as a horizontally polarized electromagnetic wave. The electromagnetic-wave radiated into space is principally received by, for example, a horizontally polarizing radar (not shown) having a required band and thereby recognized as a distress signal.

The conventional horizontally polarizing radar transponder has a problem in that since it is constructed as described above, a polarization loss is so high with respect to the vertically polarizing radar and it cannot cope with a vertically polarizing radar.

SUMMARY OF THE INVENTION

The present invention has been conceived to solve the previously—mentioned problems. It is therefore the first object of the present invention to provide a circularly polarizing radar transponder enabling to communicate even with a vertically polarizing radar as well as with a circularly polarizing radar and a horizontally polarizing radar while predetermined antenna performance (coverage or covering area, gain, etc.) is being maintained by using a circularly polarizing antenna as an alternative to a horizontally polarizing antenna.

Further, it is the second object to provide a lifesaving apparatus using the circularly polarizing radar transponder.

The above objects of the present invention are achieved by a circularly polarizing radar transponder described below. The transponder includes a circularly polarizing antenna unit for receiving all of a circularly polarized wave, a vertically polarized wave and a horizontally polarized wave therein. A receiver unit is connected to the circularly polarizing antenna unit. A transmitter unit is provided for generating a plurality of pulses upon recognizing a radio wave received by the receiver unit as a trigger. The transponder also includes a battery for supplying power to the receiver unit and the transmitter unit.

The above objects of the present invention are achieved by a lifesaving apparatus which is provided with the circularly polarizing radar transponder described above.

Other objects and further features of the present invention will be apparent from the following detailed description when read in conjunction with the accompanying drawings.

DESCRIPTION OF THE PREFERRED EMBODIMENTS

Hereinafter, embodiments in which the present invention is applied to a lifesaving apparatus will be described with reference to the accompanying drawings.

First Embodiment

Figure 1:
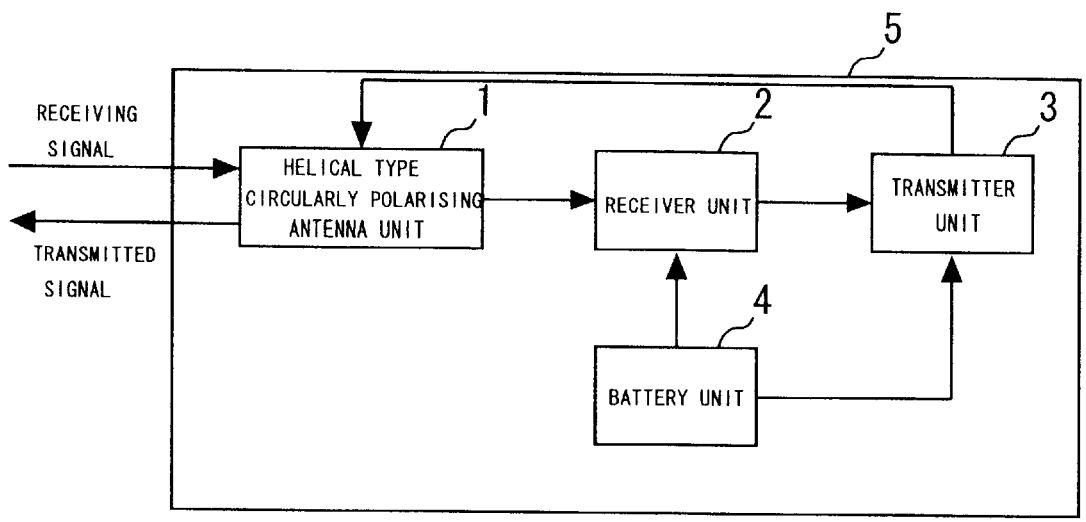
FIG. 1 is a block diagram showing a circularly polarizing radar transponder according to a first embodiment of the present invention.
Figure 7:
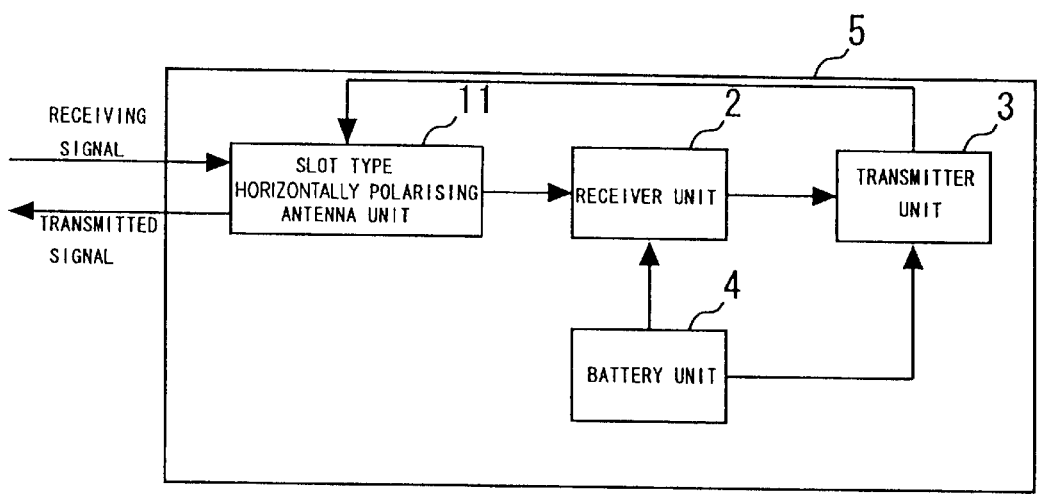
FIG. 7 is a block diagram showing a conventional circularly polarizing radar transponder.

FIG. 1 is a block diagram showing a first embodiment of the present invention. In FIG. 1, portions corresponding to those shown in FIG. 7 will be described while being identified by the same reference numerals.

In the drawing, reference numeral 1 indicated a helical type circularly polarizing antenna unit which is capable of being used in a radar system and is common to transmission and reception. The helical type circularly polarizing antenna unit 1 includes a so-called helical type circularly polarizing antenna having a helical coil although not shown in the drawing. Reference numeral 2 indicates a receiver unit for amplifying and detecting a radar wave received by the helical type circularly polarizing antenna unit 1 to thereby generate a trigger signal therefrom. Reference numeral 3 indicates a transmitter unit for generating a plurality of sweep signals (pulses) lying in the same frequency band as that of the radar wave, based on the trigger signal sent from the receiver unit 2. Reference numeral 4 indicates a battery unit for supplying power to the receiver unit 2 and the transmitter unit 3. Reference numeral 5 indicates a case with a radome, which accommodates the helical type circularly polarizing antenna unit 1, the receiver unit 2, the transmitter unit 3 and the battery unit 4 therein.

The operation of the first embodiment will next be explained.

A radio wave received by the helical type circularly polarizing antenna unit 1 is amplified and detected by the receiver unit 2, followed by supply to the transmitter unit 3 as a trigger signal indicative of the incoming of the radar wave. The transmitter unit 3 generates a plurality of sweep signals lying within the same frequency band as that of the radar wave, based on the trigger signal sent from the receiver unit 2 and sends these sweep signals to the helical type circularly polarizing antenna unit 1. The helical type circularly polarizing antenna unit 1 radiates the plurality of sweep signals sent from the transmitter unit 3 into space as a circularly polarized electromagnetic wave. The electromagnetic wave radiated into space is principally received by, for example, a circularly polarizing radar (not shown) having a required band and thereby recognized as a distress signal.

As described above, the present embodiment uses the helical type circularly polarizing antenna which manages a circularly polarized wave as a transmitting—receiving antenna. Thus, the present embodiment can communicate with both of a horizontally polarizing radar and a vertically polarizing radar respectively having a horizontal electric field element and a vertical electric field element which equally constitute the circularly polarized wave, as well as with the circularly polarizing radar having the same electric field element. Further, the present embodiment can meet the conventional coverage specifications of horizontal non-directionality and vertical range of ±12.5°.

Second embodiment

Figure 2:
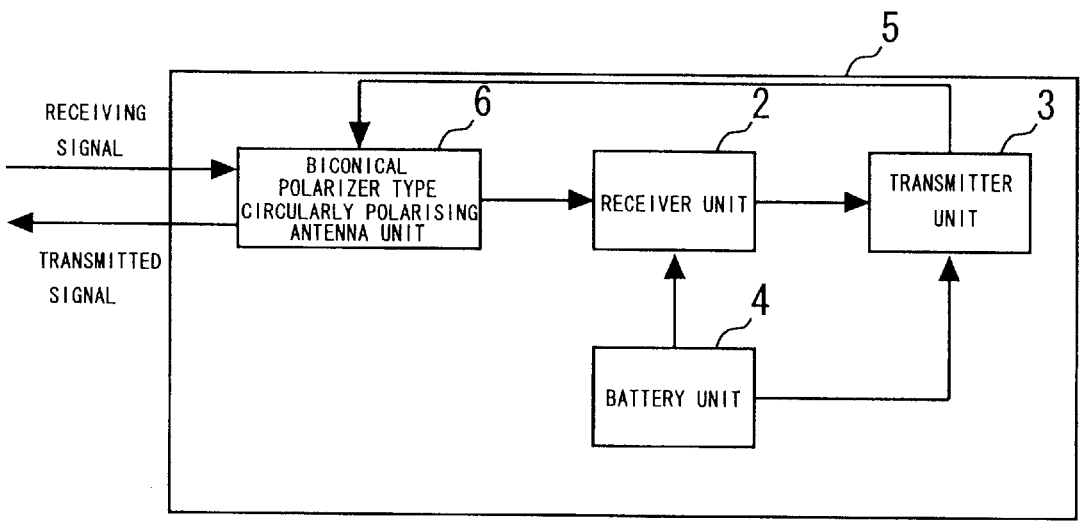
FIG. 2 is a block diagram showing a circularly polarizing radar transponder according to a second embodiment of the present invention.

FIG. 2 is a block diagram showing a second embodiment of the present invention.

In FIG. 2, portions corresponding to those shown in FIG. 1 are identified by the same reference numerals and their detailed description will be omitted.

While the helical type circularly polarizing antenna has been adopted to implement the circularly polarizing antenna in the first embodiment, a circularly polarizing antenna of a biconical polarizer type is adopted in the present embodiment.

In the drawing, reference numeral 6 indicates a circularly polarizing antenna unit of a biconical polarizer type, which is connected to a receiver unit 2 and a transmitter unit 3. The biconical polarizer type circularly polarizing antenna unit 6 includes a circularly polarizing antenna of a biconical polarizer type. As the circularly polarizing antenna, there is known one, although not shown in the drawing, wherein, for example, dielectric plates each inclined 45° are radially placed within an antenna opening so that a circularly polarized wave generator is made up of the dielectric plates alone. The present embodiment is similar in other configurations to the first embodiment shown in FIG. 1.

The operation of the present embodiment will next be described.

A radio wave received by the circularly polarizing antenna unit 6 of the biconical polarizer type is amplified and detected by the receiver unit 2, followed by supply to the transmitter unit 3 as a trigger signal indicative of the incoming of the radar wave. The transmitter unit 3 generates a plurality of sweep signals lying within the same frequency band as that of the radar wave, based on the trigger signal sent from the receiver unit 2 and sends these sweep signals to the circularly polarizing antenna unit 6 of the biconical polarizer type. The biconical polarizer type circularly polarizing antenna unit 6 radiates the plurality of sweep signals sent from the transmitter unit 3 into space as a circularly polarized electromagnetic wave. The electromagnetic wave radiated into space is principally received by, for example, a circularly polarizing radar (not shown) having a required band and thereby recognized as a distress signal.

Thus, since the circularly polarizing antenna of the biconical polarizer type is used as a transmitting—receiving antenna, the present embodiment can brought about an effect similar to the first embodiment and is capable of being applied even to the case in which there is required a circularly polarized wave for changing specifications such as the range and the direction of a covering area.

Third embodiment

Figure 3:
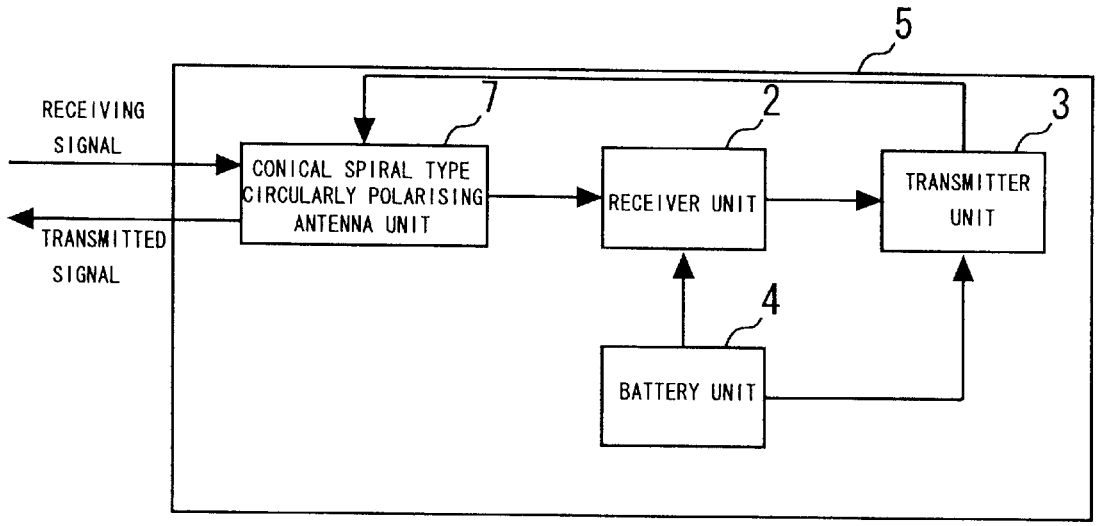
FIG. 3 is a block diagram showing a circularly polarizing radar transponder according to a third embodiment of the present invention.

FIG. 3 is a block diagram showing a third embodiment of the present invention.

In FIG. 3, portions corresponding to those shown in FIG. 1 are identified by like reference numerals and their detailed description will be omitted.

While the helical type circularly polarizing antenna has been adopted to implement the circularly polarizing antenna in the first embodiment, a circularly polarizing antenna of a conical spiral type is adopted in the present embodiment.

In the drawing, reference numeral 7 indicates a circularly polarizing antenna unit of a conical spiral type, which is connected to a receiver unit 2 and a transmitter unit 3. The conical spiral type circularly polarizing antenna unit 7 includes a circularly polarizing antenna of a conical spiral type. The conical spiral type circularly polarizing antenna comprises a conical coil onto which wire is conically wound, and a linear shaped coupler for power feeding formed at the end portion of the wire, for example although not shown in the drawing. The present embodiment is similar in other configurations to the first embodiment shown in FIG. 1.

The operation of the present embodiment will next be described.

A radio wave received by the circularly polarizing antenna unit 7 of the conical spiral type is amplified and detected by the receiver unit 2, followed by supply to the transmitter unit 3 as a trigger signal indicative of the incoming of the radar wave. The transmitter unit 3 generates a plurality of sweep signals lying within the same frequency band as that of the radar wave, based on the trigger signal sent from the receiver unit 2 and sends these sweep signals to the circularly polarizing antenna unit 7 of the conical spiral type. The conical spiral type circularly polarizing antenna unit 7 radiates the plurality of sweep signals sent from the transmitter unit 3 into space as a circularly polarized electromagnetic wave. The electromagnetic wave radiated into space is principally received by, for example, a circularly polarizing radar (not shown) having a required band and thereby recognized as a distress signal.

Thus, since the circularly polarizing antenna of the conical spiral type is used as a transmitting—receiving antenna, the present embodiment can brought about an effect similar to the first embodiment. Further, the present embodiment can also yield effects that it can be applied even to the case in which there is required a circularly polarized wave for changing specifications such as the range and the direction of a covering area, and that there can be obtained a covering region or area having directionality within a horizontal plane.

Fourth embodiment

Figure 4:
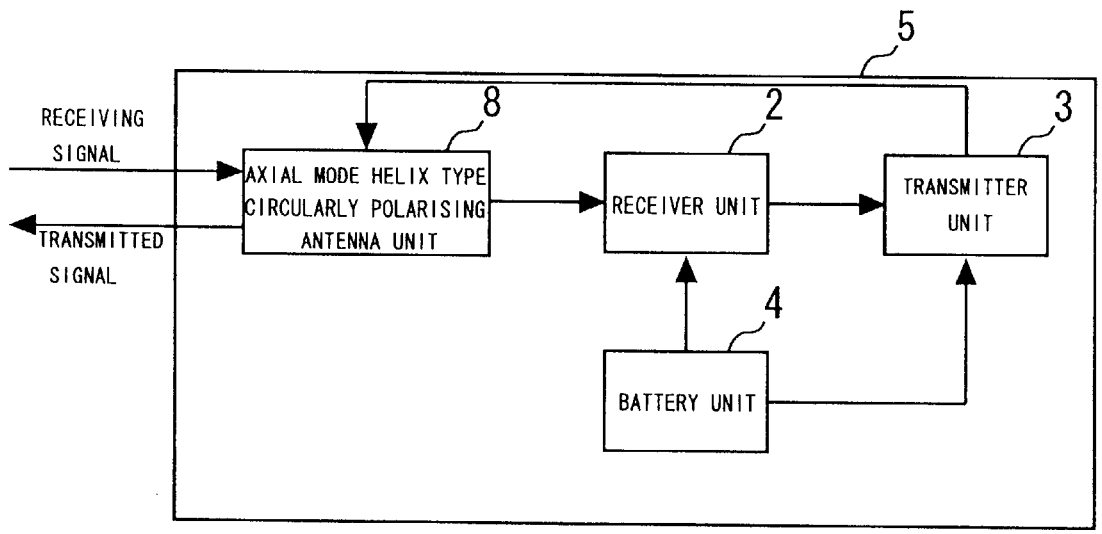
FIG. 4 is a block diagram showing a circularly polarizing radar transponder according to a fourth embodiment of the present invention.

FIG. 4 is a block diagram showing a fourth embodiment of the present invention.

In FIG. 4, portions corresponding to those shown in FIG. 1 are identified by the same reference numerals and their detained description will be omitted.

While the helical type circularly polarizing antenna has been adopted to implement the circularly polarizing antenna in the first embodiment, a circularly polarizing antenna of an axial mode helix type is adopted in the present embodiment.

In the drawing, reference numeral 8 indicates a circularly polarizing antenna unit of an axial mode helix type, which is connected to a receiver unit 2 and a transmitter unit 3. The axial mode helix type circularly polarizing antenna unit 8 includes a helical type circularly polarizing antenna although not illustrated in the drawing. The present embodiment is similar in other configurations to the first embodiment shown in FIG. 1.

The operation of the present embodiment will next be described.

A radio wave received by the circularly polarizing antenna unit 8 of the axial mode helix type is amplified and detected by the receiver unit 2, followed by supply to the transmitter unit 3 as a trigger signal indicative of the incoming of the radar wave. The transmitter unit 3 generates a plurality of sweep signals lying within the same frequency band as that of the radar wave, based on the trigger signal sent from the receiver unit 2 and sends these sweep signals to the circularly polarizing antenna unit 8 of the axial mode helix type. The axial mode helix type circularly polarizing antenna unit 8 radiates the plurality of sweep signals sent from the transmitter unit 3 into space as a circularly polarized electromagnetic wave. The electromagnetic wave radiated into space is principally received by, for example, a circularly polarizing radar (not shown) having a required band and thereby recognized as a distress signal.

Thus, since the circularly polarizing antenna of the axial mode helix type is used as a transmitting—receiving antenna, the present embodiment can brought about an effect similar to the first embodiment. Further, the present embodiment can also yield effects that it can be applied even to the case in which there is required a circularly polarized wave for changing specifications such as the range and the direction of a covering area, and that there can be obtained a covering region or area having directionality within a horizontal plane.

Fifth embodiment

Figure 5:
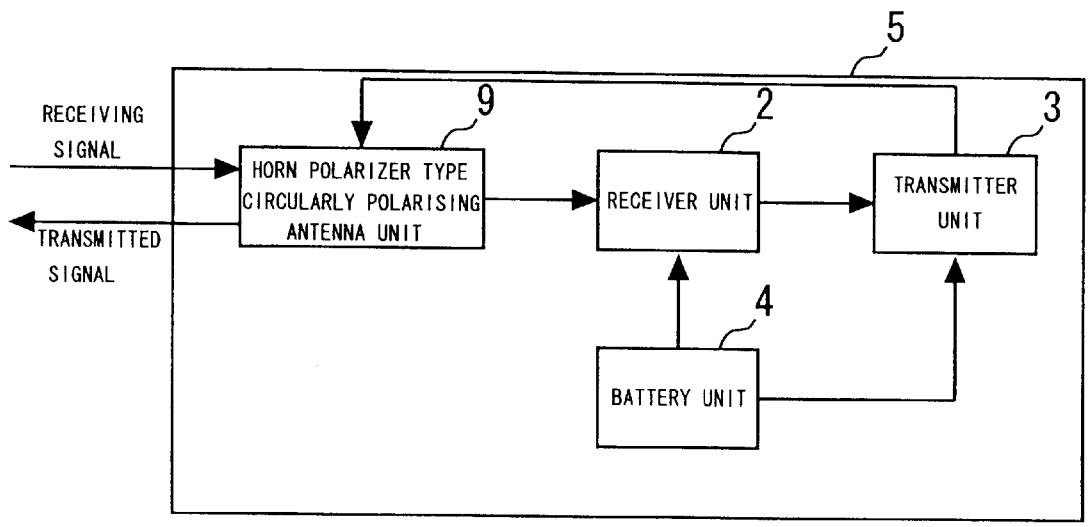
FIG. 5 is a block diagram showing a circularly polarizing radar transponder according to a fifth embodiment of the present invention.

FIG. 5 is a block diagram showing a fifth embodiment of the present invention.

In FIG. 5, portions associated with those shown in FIG. 1 are identified by the same reference numerals and their detailed description will be omitted.

While the helical type circularly polarizing antenna has been adopted to implement the circularly polarizing antenna in the first embodiment, a circularly polarizing antenna of a horn polarizer type is adopted in the present embodiment.

In the drawing, reference numeral 9 indicates a circularly polarizing antenna unit of a horn polarizer type, which is connected to a receiver unit 2 and a transmitter unit 3. The horn polarizer type circularly polarizing antenna unit 9 includes a horn polarizer type circularly polarizing antenna although not illustrated in the drawing. The present embodiment is similar in other configurations to the first embodiment shown in FIG. 1.

The operation of the present embodiment will next be described.

A radio wave received by the circularly polarizing antenna unit 9 of the horn polarizer type is amplified and detected by the receiver unit 2, followed by supply to the transmitter unit 3 as a trigger signal indicative of the incoming of the radar wave. The transmitter unit 3 generates a plurality of sweep signals lying within the same frequency band as that of the radar wave, based on the trigger signal sent from the receiver unit 2 and sends these sweep signals to the circularly polarizing antenna unit 9 of the horn polarizer type. The horn polarizer type circularly polarizing antenna unit 9 radiates the plurality of sweep signals sent from the transmitter unit 3 into space as a circularly polarized electromagnetic wave. The electromagnetic wave radiated into space is principally received by, for example, a circularly polarizing radar (not shown) having a required band and thereby recognized as a distress signal.

Thus, since the circularly polarizing antenna of the horn polarizer type is used as a transmitting—receiving antenna, the present embodiment can brought about an effect similar to the first embodiment. Further, the present embodiment can also yield effects that it can be applied even to the case in which there is required a circularly polarized wave for changing specifications such as the range and the direction of a covering area, and that there can be obtained a covering region or area having directionality within a horizontal plane.

Sixth embodiment

Figure 6:
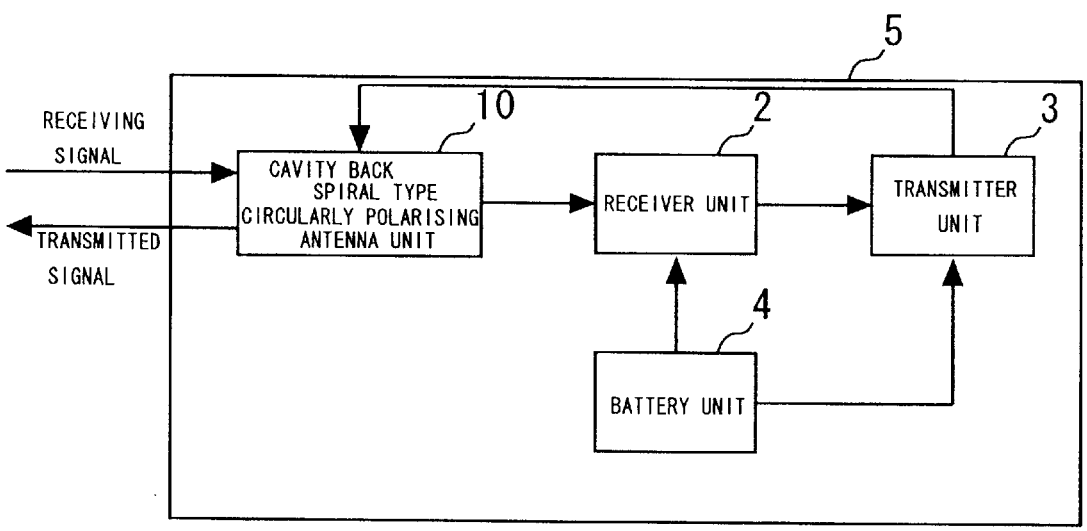
FIG. 6 is a block diagram showing a circularly polarizing radar transponder according to a sixth embodiment of the present invention.

FIG. 6 is a block diagram showing a sixth embodiment of the present invention.

In FIG. 6, portions corresponding to those shown in FIG. 1 are identified by the same reference numerals and their detailed description will be omitted.

While the helical type circularly polarizing antenna has been adopted to implement the circularly polarizing antenna in the first embodiment, a circularly polarizing antenna of a cavity back spiral type is adopted in the present embodiment.

In the drawing, reference numeral 10 indicates a circularly polarizing antenna unit of a cavity back spiral type, which is connected to a receiver unit 2 and a transmitter unit 3. The cavity back spiral type circularly polarizing antenna unit 10 includes a cavity back spiral type circularly polarizing antenna although not illustrated in the drawing. The present embodiment is similar in other configurations to the first embodiment shown in FIG. 1.

The operation of the present embodiment will next be described.

A radio wave received by the circularly polarizing antenna unit 10 of the cavity back spiral type is amplified and detected by the receiver unit 2, followed by supply to the transmitter unit 3 as a trigger signal indicative of the incoming of the radar wave. The transmitter unit 3 generates a plurality of sweep signals lying within the same frequency band as that of the radar wave, based on the trigger signal sent from the receiver unit 2 and transmits these sweep signals to the circularly polarizing antenna unit 10 of the cavity back spiral type. The cavity back spiral type circularly polarizing antenna unit 10 radiates the plurality of sweep signals sent from the transmitter unit 3 into space as a circularly polarized electromagnetic wave. The electromagnetic wave radiated into space is principally received by, for example, a circularly polarizing radar (not shown) having a required band and thereby recognized as a distress signal.

Thus, since the circularly polarizing antenna of the cavity back spiral type is used as a transmitting—receiving antenna, the present embodiment can brought about an effect similar to the first embodiment. Further, the present embodiment can also yield effects that it can be applied even to the case in which there is required a circularly polarized wave for changing specifications such as the range and the direction of a covering area, and that there can be obtained a covering region or area having directionality within a horizontal plane.

Incidentally, the aforementioned respective embodiments have described the case in which the present invention is applied to the lifesaving apparatus. However, the present invention is not necessarily limited to this. More particularly, the invention can be applied in the same manner even to other apparatuses each having a function similar to the above.

The major benefits of the present invention described above are summarized as follows:

According to the first aspect of the present invention, a circularly polarizing radar transponder comprises a circularly polarizing antenna unit capable of receiving all of a circularly polarized wave, a vertical polarized wave and a horizontally polarized wave, a receiver unit connected to the circularly polarizing antenna unit, a transmitter unit for generating a plurality of pulses upon recognizing a radio wave received by the receiver unit as a trigger, and a battery for supplying power to the receiver unit and the transmitter unit. Therefore, the present invention can communicate with all the radars using a circularly polarized wave, a horizontally polarized wave and a vertically polarized wave. Further, an advantageous effect can be brought about in that since a polarization loss due to swings in the position of the apparatus (stemming from ocean waves or the like) can be suppressed, the probability that sufferers will be found upon rescue activity can be improved. Accordingly, the present invention is especially useful for the purpose of a lifesaving apparatus or the like.

According to the second aspect of the present invention, since a helical type circularly polarizing antenna is used in the circularly polarizing antenna unit, the present circularly polarizing radar transponder can communicate with both of a horizontally polarizing radar and a vertically polarizing radar respectively having a horizontal electric field element and a vertical electric field element which equally constitute the circularly polarized wave, as well as with the circularly polarizing radar having the same electric field element. Further, an advantageous effect is brought about in that the conventional coverage specifications of horizontal non-directionality and vertical range of ±12.50° can be satisfied.

According to the third aspect of the present invention, since a biconical polarizer type circularly polarizing antenna is used in the circularly polarizing antenna unit, the present circularly polarizing radar transponder can cope with any radar wave of a circularly polarized wave, a horizontally polarized wave and a vertically polarized wave while maintaining a similar covering area as the conventional one. Thus, the present circularly polarizing radar transponder can communicate with all of a horizontally polarizing radar, a vertically polarizing radar and a circularly polarizing radar. Further, an advantageous effect is brought about in that the present circularly polarizing radar transponder can be applied even to the case in which there is required a circularly polarized wave for changing specifications such as the range and the direction of a covering area, and that there can be obtained a covering region or area having directionality within a horizontal plane.

According to the fourth aspect of the present invention, since a conical spiral type circularly polarizing antenna is used in the circularly polarizing antenna unit, the present circularly polarizing radar transponder can cope with any radar wave of a circularly polarized wave, a horizontally polarized wave and a vertically polarized wave while maintaining a similar covering area as the conventional one. Thus, the present circularly polarizing radar transponder can communicate with all of a horizontally polarizing radar, a vertically polarizing radar and a circularly polarizing radar. Further, an advantageous effect is brought about in that the present circularly polarizing radar transponder can be applied even to the case in which there is required a circularly polarized wave for changing specifications such as the range and the direction of a covering area, and that there can be obtained a covering region or area having directionality within a horizontal plane.

According to the fifth aspect of the present invention, since an axial mode helix type circularly polarizing antenna is used in the circularly polarizing antenna unit, the present circularly polarizing radar transponder can cope with any radar wave of a circularly polarized wave, a horizontally polarized wave and a vertically polarized wave while maintaining a similar covering area as the conventional one. Thus, the present circularly polarizing radar transponder can communicate with all of a horizontally polarizing radar, a vertically polarizing radar and a circularly polarizing radar. Further, an advantageous effect is brought about in that the present circularly polarizing radar transponder can be applied even to the case in which there is required a circularly polarized wave for changing specifications such as the range and the direction of a covering area, and that there can be obtained a covering region or area having directionality within a horizontal plane.

According to the third aspect of the present invention, since a horn polarizer type circularly polarizing antenna is used in the circularly polarizing antenna unit, the present circularly polarizing radar transponder can cope with any radar wave of a circularly polarized wave, a horizontally polarized wave and a vertically polarized wave while maintaining a similar covering area as the conventional one. Thus, the present circularly polarizing radar transponder can communicate with all of a horizontally polarizing radar, a vertically polarizing radar and a circularly polarizing radar. Further, an advantageous effect is brought about in that the present circularly polarizing radar transponder can be applied even to the case in which there is required a circularly polarized wave for changing specifications such as the range and the direction of a covering area, and that there can be obtained a covering region or area having directionality within a horizontal plane.

According to the third aspect of the present invention, since a cavity back spiral type circularly polarizing antenna is used in the circularly polarizing antenna unit, the present circularly polarizing radar transponder can cope with any radar wave of a circularly polarized wave, a horizontally polarized wave and a vertically polarized wave while maintaining a similar covering area as the conventional one. Thus, the present circularly polarizing radar transponder can communicate with all of a horizontally polarizing radar, a vertically polarizing radar and a circularly polarizing radar. Further, an advantageous effect is brought about in that the present circularly polarizing radar transponder can be applied even to the case in which there is required a circularly polarized wave for changing specifications such as the range and the direction of a covering area, and that there can be obtained a covering region or area having directionality within a horizontal plane.

According to the eighth aspect of the present invention, an advantageous effect is brought about in that since the inventive circularly polarizing radar transponder is provided, a polarization loss due to swings in the position of the apparatus (stemming from ocean waves or the like) can be suppressed and the probability that sufferers will be found upon rescue activity can be improved.

Further, the present invention is not limited to these embodiments, but variations and modifications may be made without departing from the scope of the present invention.

The entire disclosure of Japanese Patent Application No. Hei 11-197905 filed on Jul. 12, 1999 including specification, claims, drawings and summary are incorporated herein by reference in its entirety.

What is claimed is:

1. A circularly polarizing radar transponder, comprising:
   a circularly polarizing antenna unit for receiving any of a circularly polarized radio wave, a vertically polarized radio wave and a horizontally polarized radio wave therein:
   a receiver unit connected to said circularly polarizing antenna unit and detecting any of said circularly polarized, vertically polarized, and horizontally polarized radio waves, and producing a trigger signal in response to said detection;
   a transmitter unit for receiving said trigger signal from said receiver unit and generating a plurality of pulses upon reception of said trigger signal; and
   a battery for supplying power to said receiver unit and said transmitter unit.

2. The circularly polarizing radar transponder according to claim 1, wherein said circularly polarizing antenna unit comprises a helical type circularly polarizing antenna.

3. The circularly polarizing radar transponder according to claim 1, wherein said circularly polarizing antenna unit comprises a biconical polarizer type circularly polarizing antenna.

4. The circularly polarizing radar transponder according to claim 1, wherein said circularly polarizing antenna unit comprises a conical spiral type circularly polarizing antenna.

5. The circularly polarizing radar transponder according to claim 1, wherein said circularly polarizing antenna unit comprises an axial mode helix type circularly polarizing antenna.

6. The circularly polarizing radar transponder according to claim 1, wherein said circularly polarizing antenna unit comprises a horn polarizer type circularly polarizing antenna.

7. The circularly polarizing radar transponder according to claim 1, wherein said circularly polarizing antenna unit comprises a cavity back spiral type circularly polarizing antenna.

8. A lifesaving apparatus provided with a radar transponder, said radar transponder comprising:
   a circularly polarizing antenna unit for receiving any of a circularly polarized radio wave, a vertically polarized radio wave and a horizontally polarized radio wave therein:
   a receiver unit connected to said circularly polarizing antenna unit and detecting any of said circularly polarized, vertically polarized, and horizontally polarized radio waves, and producing a trigger signal in response to said detection;
   a transmitter unit for receiving said trigger signal from said receiver unit and generating a plurality of pulses upon reception of said trigger signal; and
   a battery for supplying power to said receiver unit and said transmitter unit.

9. The lifesaving apparatus according to claim 8, wherein said circularly polarizing antenna unit comprises a helical type circularly polarizing antenna.

10. The lifesaving apparatus according to claim 8, wherein said circularly polarizing antenna unit comprises a biconical polarizer type circularly polarizing antenna.

11. The lifesaving apparatus according to claim 8, wherein said circularly polarizing antenna unit comprises a conical spiral type circularly polarizing antenna.

12. The lifesaving apparatus according to claim 8, wherein said circularly polarizing antenna unit comprises an axial mode helix type circularly polarizing antenna.

13. The lifesaving apparatus according to claim 8, wherein said circularly polarizing antenna unit comprises a horn polarizer type circularly polarizing antenna.

14. The lifesaving apparatus according to claim 8, wherein said circularly polarizing antenna unit comprises a cavity back spiral type circularly polarizing antenna.

15. The circularly polarizing radar transponder of claim 1, wherein said plurality of pulses are propagated by said circularly polarizing antenna unit.

16. The lifesaving apparatus of claim 8, wherein said plurality of pulses are propagated by said circularly polarizing antenna unit.

* * * * *